May 10, 1949.  F. T. POWERS ET AL  2,469,891
COLOR SEPARATION CAMERA
Filed Sept. 14, 1945  5 Sheets-Sheet 1
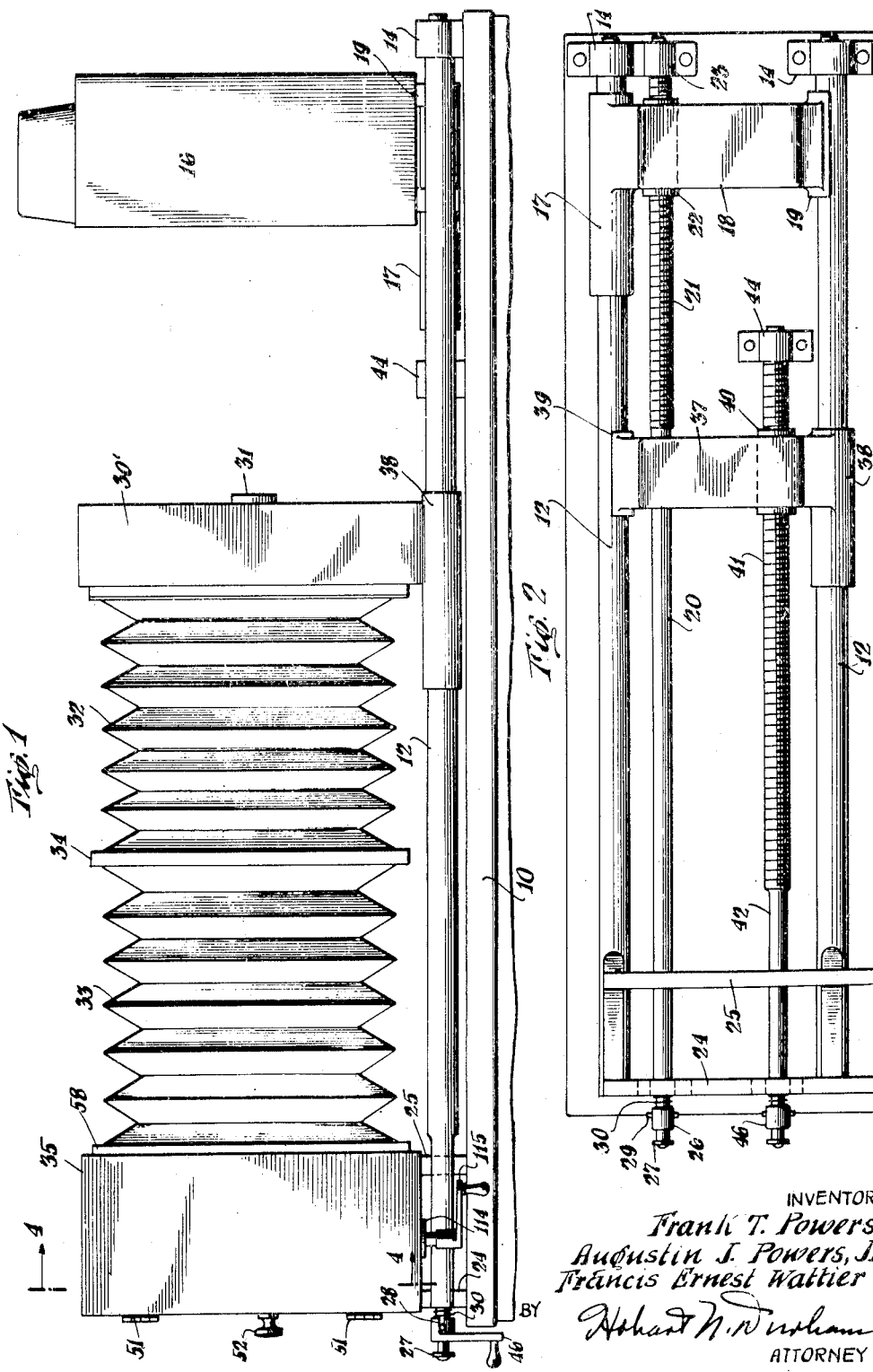
INVENTORS
Frank T. Powers
Augustin J. Powers, Jr.
Francis Ernest Wattier
BY
Hobart N. Durham
ATTORNEY

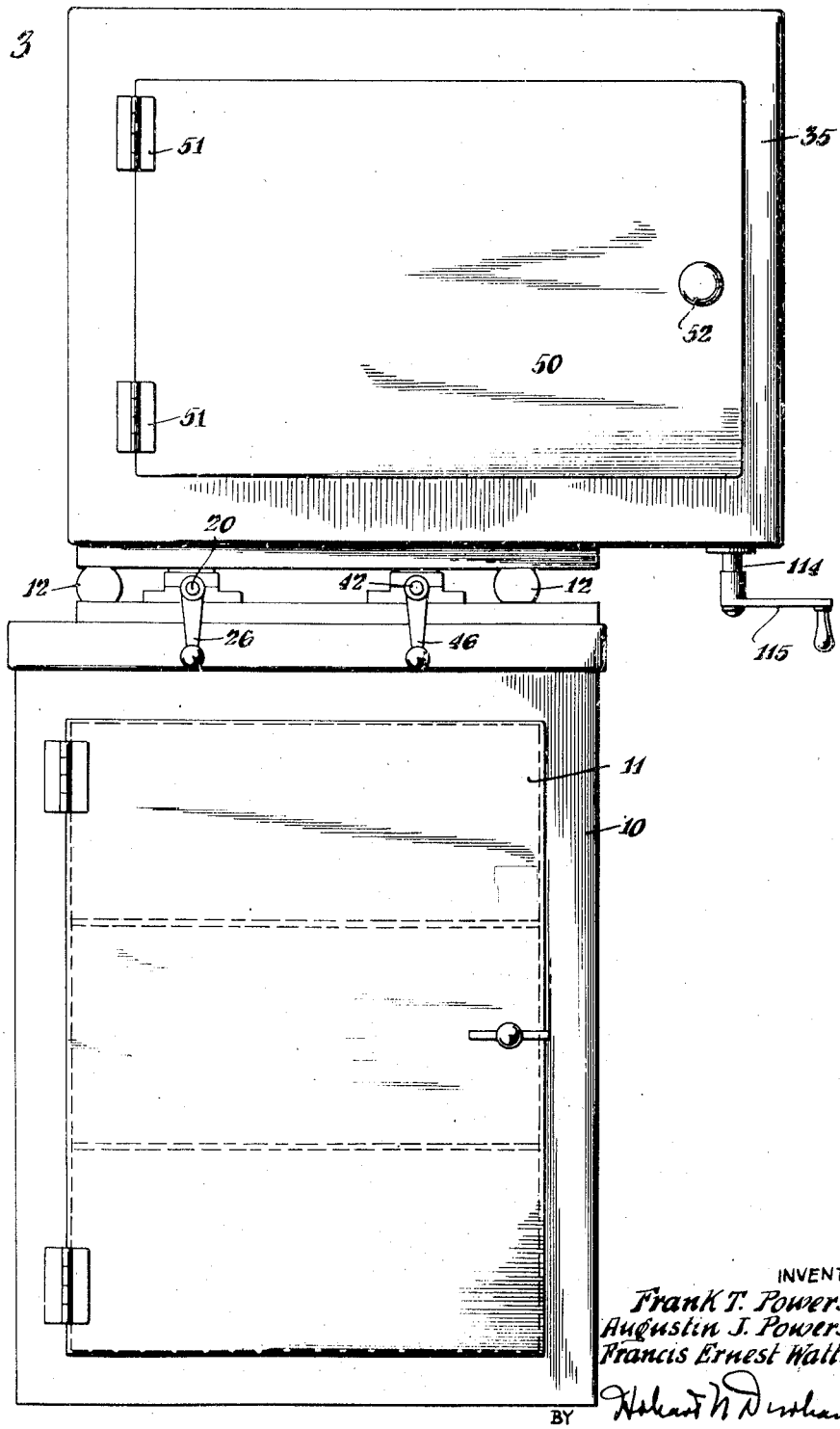

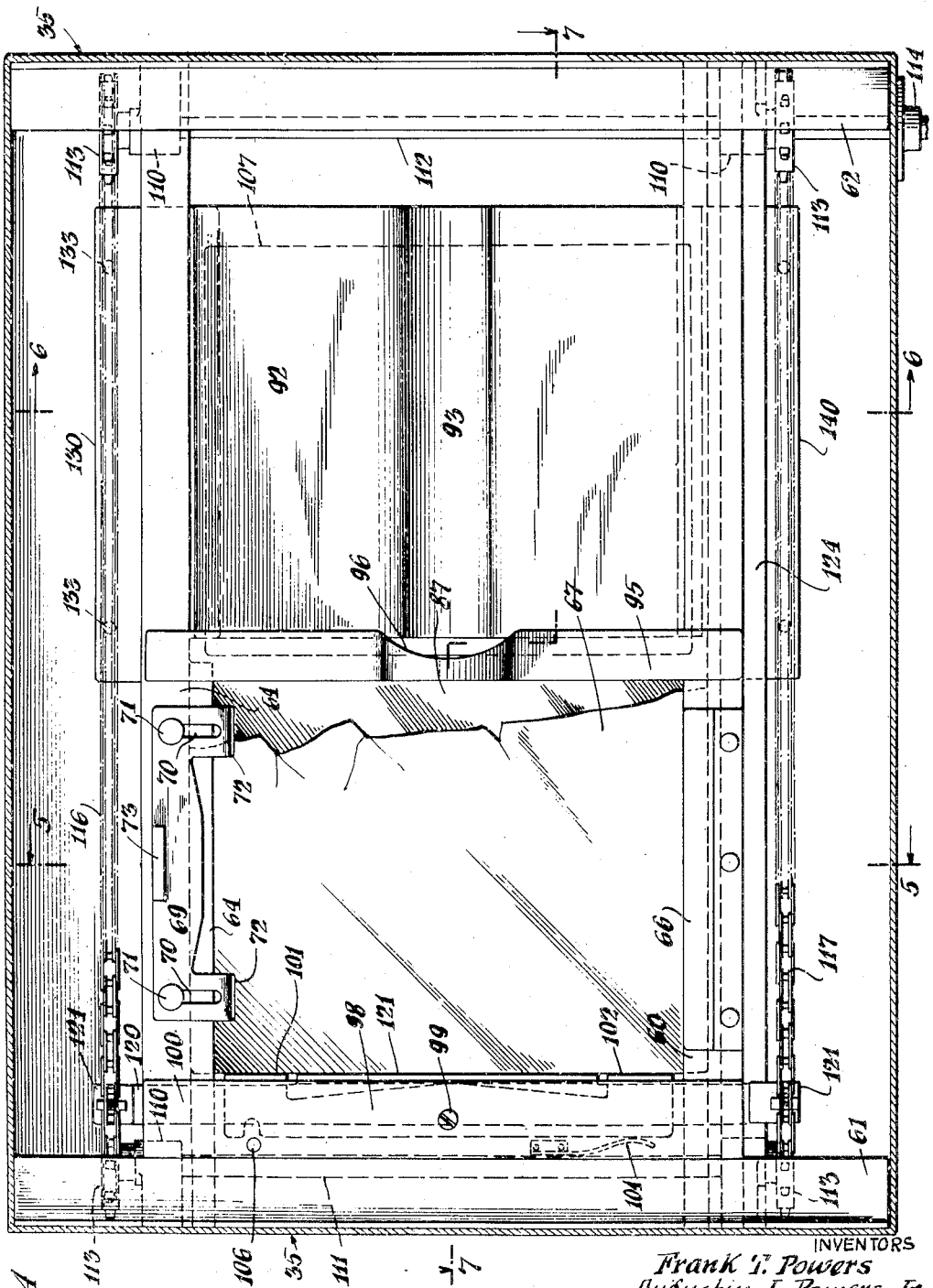

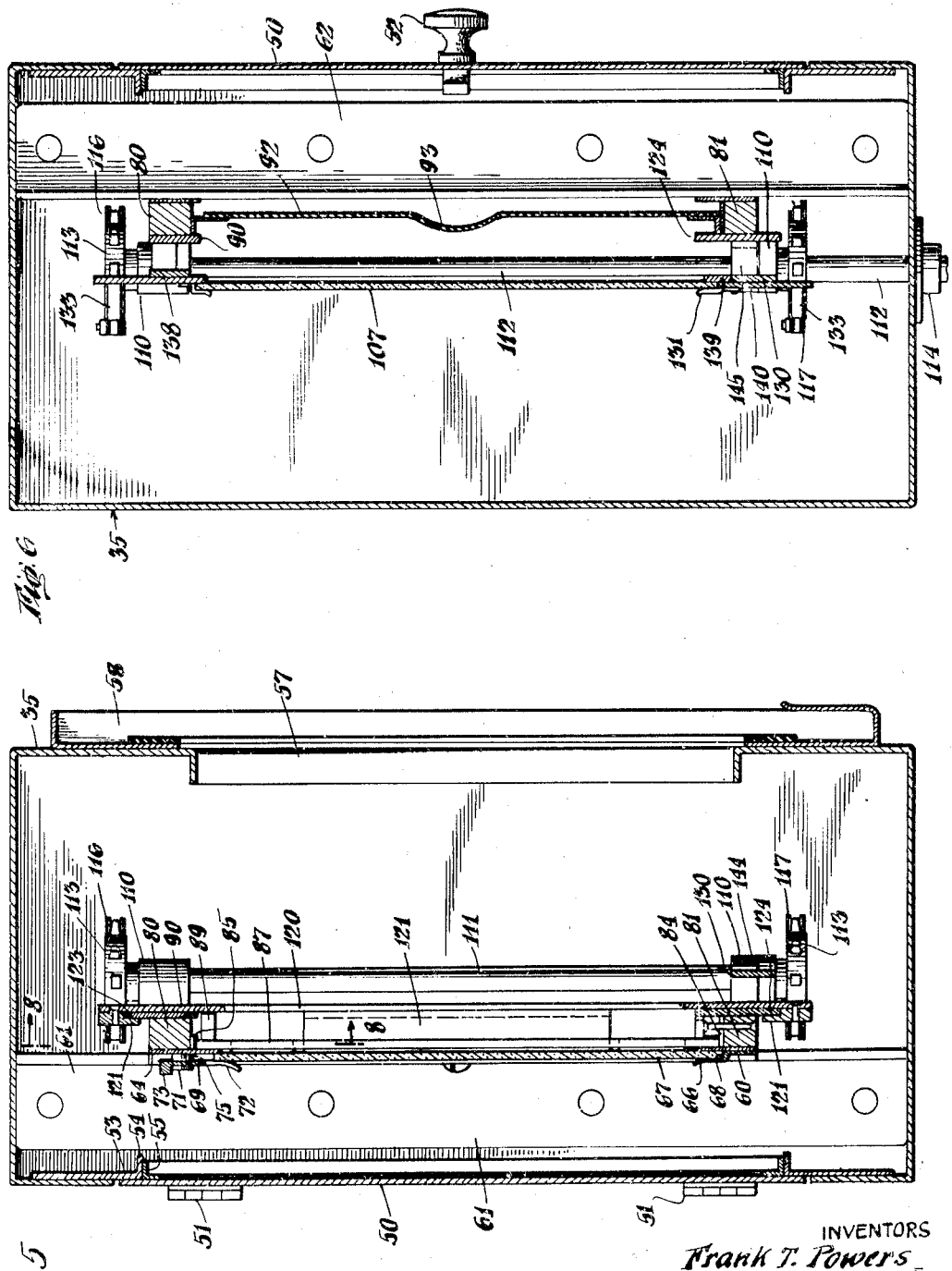

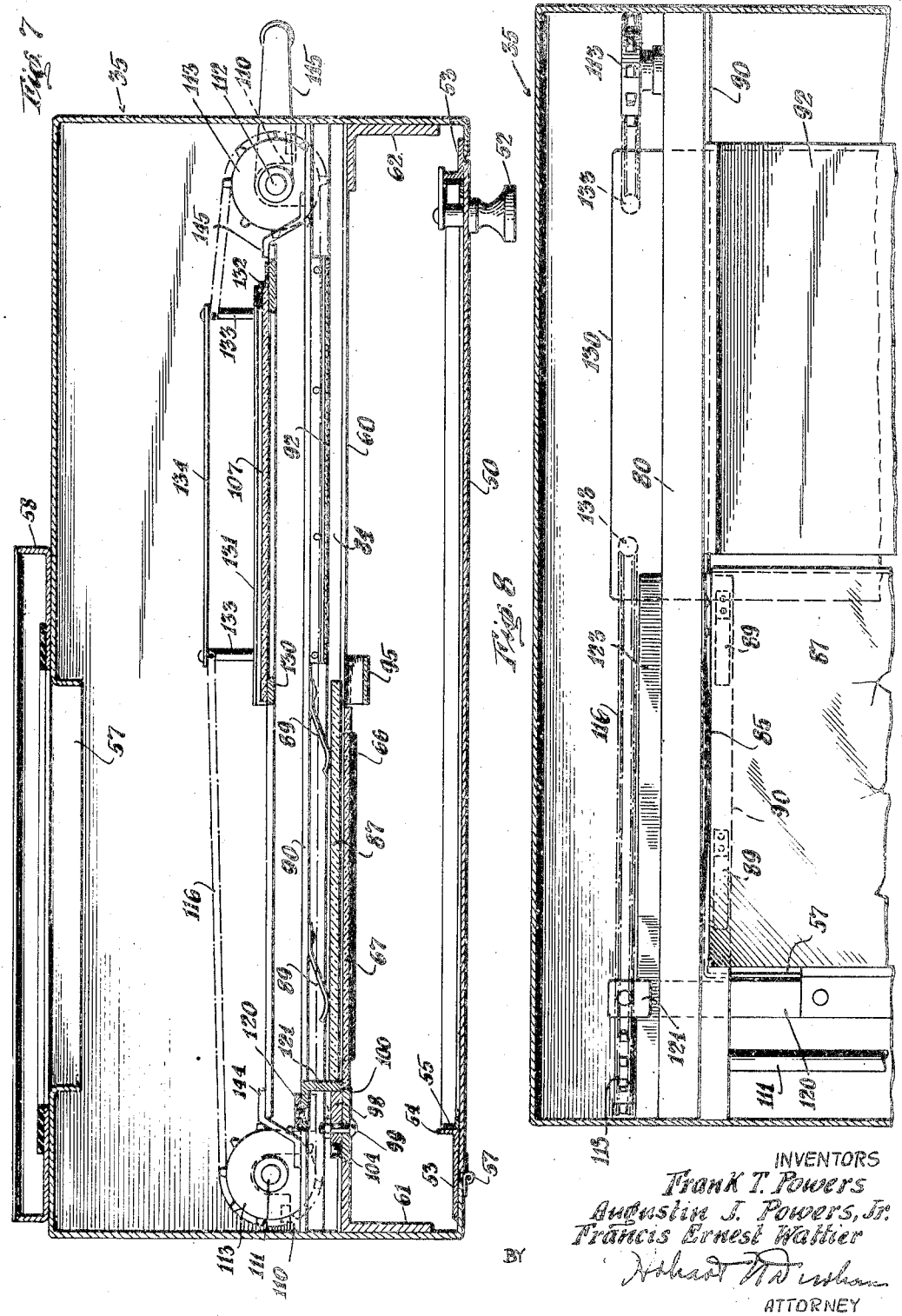

Patented May 10, 1949

2,469,891

UNITED STATES PATENT OFFICE 2,469,891

COLOR SEPARATION CAMERA

Frank T. Powers, Glen Cove, and Augustin J. Powers, Jr., Roslyn Heights, N. Y., and Francis E. Wattier, St. Lambert, Quebec, Canada, assignors to Powers Photo Engraving Company, Glen Cove, N. Y., a corporation of New York Application September 14, 1945, Serial No. 616,342

12 Claims. (Cl. 88—24)

1

The present invention relates to a novel and improved camera and more particularly to a camera for making color separation negatives of colored subjects to be used in making printing members, such as process halftone printing plates.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 1 is a side elevation of a typical camera in accordance with the present invention, certain parts being broken away;

Figure 2 is a top plan view of the bed of the camera, certain of the parts shown in Figure 1 being removed;

Figure 3 is an end elevation of the camera of Figure 1;

Figure 4 is a sectional view taken on the line 4—4 of Figure 1;

Figures 5 and 6 are sectional views taken on the lines 5—5 and 6—6 of Figure 4;

Figure 7 is a horizontal section taken on the line 7—7 of Figure 4; and

Figure 8 is a fragmentary section taken on the line 8—8 of Figure 5.

In the preparation of color separation negatives for making reproductions of paintings, color prints and other colored subjects, a set of negatives, usually three or four, are made representing the variously colored portions of the subject by variations in density, the several negatives being usually taken through different color filters and for the best results it is important that, in addition to the color filters, registering masks be provided for modifying the images of the several color separations.

While the camera of the present invention may be used to carry out various processes, it is particularly adapted to carry out the process disclosed in the copending application of Frank T. Powers, Augustin J. Powers, Jr., and Francis E. Wattier, Ser. No. 617,114, filed September 18, 1945, now abandoned.

The present invention has for its object the provision of a novel and improved camera for making highly corrected color separation negatives for the subsequent production of printing plates or colored reproductions. A further object is the provision of an improved color separation camera which will produce accurately registered and highly corrected color separation negatives efficiently and with only a moderate degree of skill and care.

The camera of the present invention preferably comprises the usual lens, bellows and adjustments for focus, aperture, enlargement or reduction and exposure together with means whereby the light passing through the lens may be passed through suitable light filters. At the rear of the camera is provided means for supporting a sensitized element in a plane normal to the lens axis, including means whereby successive sensitized elements may be substituted one for the other, for the exposure of the several negatives, at the same time insuring accurate location of the several plates in the same focal plane so that all of the images are of equal size and definition. Between the lens and sensitized element are provided, preferably immediately adjacent to the sensitized element, means for supporting a mask and alternatively bringing a compensating transparent sheet into the path of the light, said means including provision for the accurate return of the masking plate to its original position whereby it may be exposed, removed for processing and returned to a position accurately corresponding to its first position, when it is used to mask the exposure of a subsequent separation negative.

Thus, a sensitive plate may be positioned in the masking position and exposed in that position through a suitable filter, after which it is removed, developed, fixed, washed, dried and returned to its original position. Separation negatives may then be made through the same or other filters with the mask in place. Means are also provided whereby the mask or a compensating sheet of transparent material of equal thickness is certain of being positioned just in front of the negative material so that accurate register of the several separation negatives is assured, and any one of them may be made through the mask or not as desired, or the mask may be used for only a portion of the exposure of each or any of them.

While the structure of the present camera is particularly adapted for the preparation of color separation negatives for use in the production of color prints and other photomechanical color printing elements, the camera may be used for other purposes as desired whenever it is desired to make a negative through a transparent or translucent sheet bearing light modified portions.

It will be understood that the foregoing general description and the following detailed description as well are exemplary and explanatory of the invention but are not restrictive thereof.

Referring now in detail to the present preferred and illustrative embodiment of the invention as shown in the accompanying drawings, the camera is firmly supported on a base which preferably includes a cabinet 10 formed as a light-tight chamber with a door 11 in which sensitized material and other supplies may be stored. On the top of cabinet 10 are mounted a pair of parallel horizontal rods 12 which are firmly fastened at one end by means of the brackets 14 to the upper surface of the cabinet and between bars 24 and 25 at their other ends and provide a pair of spaced rails on which the camera parts are horizontally slidable toward and from each other.

Near one end of the cabinet 10 is provided a copy support which may hold opaque copy to be copied by reflected light, or may be an illumination box 16 to support an extra-subtractive color transparency, such as a "Kodachrome" or other transparency to be copied by transmitted light. At the bottom of the box is a sleeve 17, closely fitted to one of the rods 12, and movable axially therealong, sleeve 17 being formed integrally with a laterally extending portion 18 having an arcuate end 19 to fit over the other rod 12 and a flat upper surface to which the box 16 may be securely attached. Closely adjacent the sleeve 17, and parallel to the rods 12 is journalled a rod 20 having a screw-threaded portion 21 engaging with a similarly threaded sleeve 22 formed as a part of the laterally extending member 18. Rod 20 is journalled in a boss 23 formed as an integral portion of one of the brackets 14, and suitably held against axial movement, while its other end is journalled in bearings 15 secured between bars 24 and 25 on cabinet top 10 at the other end of the camera.

A handle 26 is loosely mounted on one end of the rod 20 beyond the bearings 15, is held against removal by the enlarged end 27 and is slotted, as at 28 to engage a pin 29 extending diametrally through the rod. A coil spring 30 is provided so that upon the hand being removed from handle 26, the handle is slid axially to disengaged position allowing it to turn freely on the rod 20. By engaging and turning the handle 26 the copy support 16 may be moved longitudinally of the camera bed to any desired position.

The camera comprises generally a front portion 30 including conventional means for supporting the camera lens 31, bellows portions 32 and 33 connected by an intermediate frame 34, and a rear plate supporting portion 35. The rear plate-supporting portion is securely fastened to and supported on the upstanding bars 24 and 25 so that it remains in a fixed position with respect to the cabinet 10 and base, while the front portion 30 carrying the lens 31 is supported for longitudinal movement by means of a laterally extending bracket 37 formed integrally with sleeve 38, which sleeve is slidably fitted to the other guide rod 12.

The other end of bracket 37 is formed with an arcuate end 39 which rides on the first guide rod 12, and bracket 37 is also formed with a threaded sleeve 40 which fits and is slidably moved by the screw-threaded portion 41 of rotatable screw rod 42 also parallel to the guide rods 12 and screw rod 20. Screw rod 42 is journalled at one end in plates 24 and 25 and at its other end is journalled in and held against axial movement by bracket 44 attached to the upper surface of cabinet 10. At its free end rod 42 is provided with an engageable handle 46 similar to the previously described handle 26 so that rode 42 may be rotated to cause the camera front 30 and lens 31 to move toward and away from the copyholder 16 and the camera back 35.

The handles 26 and 46 being located at the rear of the camera allow the operator to make the necessary adjustments for image size and critical focus while he is observing the image formed at the rear of the camera.

At the rear of the camera back 35 is provided a light-tight door mounted on hinges 51 and provided with a latching knob 52 by which it may be opened or locked shut, door 50 overlapping to a considerable extent the marginal frame 53 having an inwardly turned lip 54 which cooperates with a lip 55 mounted on the interior of the door to provide an efficient light-seal at the rear of the camera. The rear portion 35 of the camera is otherwise formed to provide a light-tight box having only a forward opening 57 adjacent the mounting 58 for the rear portion of the bellows 33, so that except for the light coming through the camera lens 31, nothing within the portion 35 can be exposed to light while the door 50 remains closed.

Means are provided for supporting a sensitized photographic plate within the rear portion 35, or alternatively for supporting a ground glass in the same position, the sensitized plate or ground glass ordinarily being held in accurate perpendicular relation to the axis of the lens 31. For this purpose rail 60 extends horizontally between the angle frames 61 and 62 at either side of the camera and firmly attached to the interior of the portion 35. Parallel to rail 60 and spaced considerably thereabove is another horizontal rail 64, the two rails having their rear faces lying accurately in the plane perpendicular to the lens axis. At the rear face of the lower rail 60 is provided a bent metal strip 66 fastened by rivets to the rail 60, and forming therewith a narrow channel having a lower beveled edge 68 to receive the lower edge of the sensitized plate or ground glass 67.

The upper rail 64, at its rear face is provided with a vertically slidable spring clip 69 having parallel slots 70 and held to the rail 64 by studs 71. Spring clip 69 is formed with depending fingers 72, and with a hand grip 73, and is slightly spaced from the rail 64 by washers 75. In its raised position, spring clip 69 allows a sensitized plate or ground glass 67 to be inserted in the channel 68 and against the rear face of rail 64, and by pushing down on the hand grip 73, the spring fingers 72 engage the rear face of the plate to secure the plate in position. The position of the rails 60 and 64 is such that the ground glass or sensitized plate is at least approximately centered with respect to the lens axis (shown at the left of the camera back), the opening between the rails 60 and 64 being such as to accommodate a standard size plate, e. g. 8" x 10", with only a small portion of the top and bottom edges shielded from the image to be formed by the lens 31.

Means are provided for removably supporting a second sensitized plate, or a developed negative immediately in front of the sensitized plate or ground glass and parallel thereto, and for removing it from that position without opening the hinged camera back 50, permitting it to be accurately returned to its original position. As embodied, a pair of parallel frames 80 and 81 extend between the angle frames 61 and 62 and are rigidly fastened thereon, frames 80 and 81 being parallel to each other and only slightly below and above the adjacent edges of rails 60 and 64, respectively.

On the forward side of rails 60 and 64, and between the adjacent edges of rails 80 and 81 are formed guideways to receive the second sensitized plate or negative 87 as it is slid into and out of registering position with the first sensitized plate or ground glass. The bottom of the channel formed by rails 60 and 61 is provided with a flat horizontal wear plate 84, while the channel on the underside of rail 80 is formed by a narrow leaf spring 85 secured to the underside of rail 80 and adapted to press against the upper edge of the second sensitized plate 87. The channels for the second sensitized plate 87 extend considerably to one side of the exposure area so that the plate 87 may be completely removed from the exposure area without being removed from the camera.

Light leaf springs 89 are mounted on plates 90 at the top and bottom of the exposure area, and lightly press the second plate 87 toward the first plate, and into engagement with the forward face of rails 60 and 64. The channels for receiving the plate 87 extend to the side of the exposure area, and when the plate is away from the exposure area the plate 87 is free from springs 89, and is loosely held between the rails 60, 64 and a backing sheet 92 which extends vertically between the rails 80 and 81. To facilitate movement of the plate 87 from its retracted position to its registering position where it is superimposed over the first sensitized plate, the backing sheet 92 is preferably provided with a horizontal, shallow groove or channel 93 which serves as a guide for the operator's finger as he moves the plate, from right to left as shown in the illustrated form. A strap of metal 95 extends from rail 60 to rail 64, and is provided with a cutout portion 96 which is indented so that the extreme edge of the plate 87 extends into the cutout portion only very slightly as the plate 87 has been moved to its registering or exposure position.

At the other vertical edge of the plate 87 is provided a stop serving accurately to limit the lateral position of the plate 87, and to provide a distinct tactile indication that the plate has been moved to a definite position. For this purpose stop member 98 is pivoted by pivot 99 on bar 100 supported between the rails 60 and 64, and at the extreme left of the camera back. Stop 98 is provided with projections 101 and 102 formed as aligned flat surfaces to engage with the left hand edge of the plate 87. Means are provided for tilting the stop about its pivot and normally maintaining it in a slightly tilted position. For this purpose a small leaf spring 104 engages with one end of the stop 98 to swing it about its pivot until it is held against further movement by pin 106.

As the plate 87 is moved into registering or exposure position, its left hand edge first engages surface 102 swinging the stop 98 until surface 101 engages with the upper portion of the left-hand edge of the plate 87. This engagement of the surface 101 with the plate 87 against the light tension of the spring 104 causes the plate to be brought to an abrupt stop in a definite position, at the same time creating a distinct tactile stimulus which advises the operator even in the dark that the plate is properly and definitely located. In this condition plates 67 and 87 are accurately perpendicular to the lens axis, and are accurately located in closely adjacent parallel planes and their parts are in a definite relation to each other and plate 87 may be accurately returned to the same position time and again after removal from this registering or exposure position.

In the right hand position of the plate 87, shown in dotted lines in Figure 4, plate 87 is held in the bottom channel between rails 60 and sheet 92, and it is held against falling out by the upper portion of sheet 92 and the strap 95 which may overlie a vertical edge of the plate 87.

In order to maintain proper image size and accurate registration of the image on plate 67, regardless of whether or not plate 87 is in exposure position, a third plate 107 is provided in front of plate 87, and may be moved into and out of the exposure area. Plate 107 is transparent and of substantially identical thickness as plate 87, both plates generally being formed of similar glass, so that the refraction caused by the plate 87 or plate 107 is equal, thereby producing images of identical size regardless of which plate is traversed by the image.

Means operable from the exterior of the camera are provided for retracting plate 87 from its exposure position, and simultaneously moving the plate 107 into exposure position, thereby completely eliminating the possibility of a careless operator removing the plate 87 without inserting the compensating plate 107 in its place.

As embodied, brackets 110 are provided at either side of the camera on both the upper and lower rails 80 and 81, supporting vertical shafts 111 and 112 which carry the sprockets 113. Shaft 112 extends through a flange 114 on the bottom of the camera, and is connected to an external handle 115 by the shafts 111 and 112 and the sprockets 113 may be rotated. Around the upper pair of sprockets 113 extends a reach of chain 116, and a similar reach 117 is provided for the lower pair of sprockets 113.

Between the upper and lower chain reaches 116 and 117, and fast to the rear of each reach of chain is a bar 120 extending vertically and having rearwardly turned lip 121 which extends into the path of plate 87, lip 121 lying between the stop surfaces 101 and 102, and being movable sufficiently to the left to clear the edge of plate 87 in its registering position. The upper and lower ends of bar 120 are formed with guide channels to ride on the edges of guide strips 123 and 124 which are fast to the forward faces of rails 80 and 81 respectively. Thus as the sprockets are rotated (counter clockwise Figure 7) lip 121 is moved to the right carrying the plate 87 with it into the right hand portion of the camera back.

On the front reaches of the chain is mounted a frame 130 having channels or retaining strips 131, 132 by which the clear, transparent and preferably colorless, compensating plate 107 is secured thereto. Frame 130 is mounted by posts 133 on the chains 116 and 117, and a tension member 134 at the top and a similar tension member at the bottom to prevent undue strain on the studs. Frame 130 is held by the tension of the chain against a guide strip 138 at its upper edge, and rides on another guide strip 139 at the bottom, frame 130 also being provided with a depending portion 140 which rides against the forward face of guide 139. Lip 121 and frame 130 are so positioned that at one extreme the plate 107 is at the extreme right of the camera while at the other position it is in exposure or registering position, and plate 87 has been completely removed from the exposure area. Stops 144 and 145 are provided for limiting the extreme travel of the frame 130.

In the operation of the device illustrated in the drawings, the copy is supported on holder 16 and properly illuminated, by reflection or transmission; the lens 31 and copy or support 16 are moved to the correct longitudinal positions so that the proper size image of the copy is critically focused on the ground glass 67 held at the rear of the camera. When it has been ascertained that the image is properly focused and is accurately dimensioned, the ground glass 67 is removed and an unexposed color sensitive photographic plate is placed in the channel between rail 70 and backing sheet 92. The plate 87 is then moved until it contacts with stop 98 and is accurately located in exposure position. The hinged light-tight door 50 is then closed and latched, and the plate 87 is exposed to the copy through the desired color filter. Handle 115 is then rotated to move lip 121 toward the right carrying plate 87 with it, and then the handle 115 is reversely moved to restore the lip 121 to its original position (Figure 4). Plate 87 is removed from the camera, processed in the usual way, and when dry is returned to the camera and again brought into its original position in contact with the surfaces 101 and 102 of stop 98.

A second color sensitive plate is then placed in the position previously occupied by the ground glass 67, and after the door 50 has been latched in closed position and with a color filter over the lens, if desired, the new plate 67 is exposed to the image of the copy through the modifying or masking negative image carried by plate 87.

It is oftentimes desirable that only a portion of the exposure of the sensitized plate 67 be made through the masking or modifying negative 87. When such a partial exposure is desired, the exposure is interrupted, handle 115 is turned to remove the plate 87 from its registering position where it will modify the image cast on plate 67, this turning of handle 115 simultaneously positioning the compensating plate 107 between the lens 31 and the partially exposed plate 67. With the compensating plate thus positioned the exposure of plate 67 may be completed. Handle 115 may then be rotated to return the compensating plate 107 to its right hand position, and plate 67 may be removed for processing.

The operations are then repeated as desired for the preparation of the remainder of the set of separation negatives.

Conveniently, the back of the camera may be built into a darkroom wall so that the door 50 opens thereinto, in which case the operations are greatly simplified and many operations may be carried out without closing the door 50 as the plates 67 or 87 are thus guarded against undesired exposure to extraneous light.

The invention in its broader aspects is not limited to the specific mechanisms shown and described but departures may be made therefrom within the scope of the accompanying claims without departing from the principles of the invention and without sacrificing its chief advantages.

What is claimed is:

1. In a color separation camera, the combination of means for supporting a sensitized element or a ground glass in the focal plane of the camera, a slideway for a second sensitized element to overlie the first element in register therewith or to be positioned completely to one side thereof where it may be placed in or removed from the slideway, said slideway having edges to overlie opposite margins of the second element and having a fixed position axially of the camera, spring means to press against opposite edges of the second sensitized element and urge the element against the fixed edges and cooperating with said slideway for holding the second element parallel to the first element.

2. In a color separation camera, the combination of means for supporting a sensitized element or a ground glass in the focal plane of the camera, a slideway for a second sensitized element to overlie the first element in register therewith or to be positioned completely to one side thereof where it may be placed in or removed from the slideway, said slideway having edges to overlie opposite margins of the second element and having a fixed position axially of the camera, spring means to press against opposite edges of the second sensitized element and urge the element against the fixed edges and cooperating with said slideway for holding the second element parallel to the first element, a sheet in front of the side position of said second element and having a finger guide therein for guiding a finger pushing said second element into registering position.

3. In a color separation camera, the combination of means for supporting a sensitized element or a ground glass in the focal plane of the camera, a slideway for a second sensitized element to overlie the first element in register therewith or to be positioned completely to one side thereof where it may be placed in or removed from the slideway, said slideway having edges to overlie opposite margins of the second element and having a fixed position axially of the camera, spring means to press against opposite edges of the second sensitized element and urge the element against the fixed edges and cooperating with said slideway for holding the second element parallel to the first element, and lateral registering means comprising a pivoted member having spaced stops, one at either side of the pivot, to engage a vertical edge of said second element in the slideway and locate the element laterally in the camera.

4. In a color separation camera, the combination of means for supporting a sensitized element or a ground glass in the focal plane of the camera, a slideway for a second sensitized element to overlie the first element in register therewith or to be positioned completely to one side thereof where it may be placed in or removed from the slideway, and lateral registering means comprising a pivoted member having spaced stops, one at either side of the pivot, to engage a vertical edge of said second element in the slideway and locate the element laterally in the camera.

5. In a color separation camera, the combination of means for supporting a sensitized element or a ground glass in the focal plane of the camera, a slideway for a second sensitized element to overlie the first element in register therewith or to be positioned completely to one side thereof where it may be placed in or removed from the slideway, and lateral registering means comprising a pivoted member having spaced stops, one at either side of the pivot, to engage a vertical edge of said second element in the slideway and locate the element laterally in the camera, and spring means biasing said member whereby one stop is engaged by the element before the other.

6. In a color separation camera, the combination of means for supporting a sensitized element or a ground glass in the focal plane of the camera, a slideway for a second sensitized element to overlie the first element in register therewith or to be positioned completely to one side thereof where it may be placed in or removed from the slideway, and lateral registering means comprising a pivoted member having spaced stops, one at either side of the pivot, to engage a vertical edge of said element in the slideway and locate the element laterally in the camera, and means operable from outside the camera for retracting the second element from registering position to its side position.

7. In a color separation camera, the combination of means for supporting a sensitized element or a ground glass in the focal plane of the camera, a slideway for a second sensitized element to overlie the first element in register therewith or to be positioned completely to one side thereof where it may be placed in or removed from the slideway, said slideway having edges to overlie opposite margins of the second element and having a fixed position axially of the camera, spring means to press against opposite edges of the second sensitized element and urge the element against the fixed edges and cooperating with said slideway for holding the second element parallel to the first element, and lateral registering means comprising a pivoted member having spaced stops, one at either side of the pivot, to engage a vertical edge of said second element in the slideway and locate the element laterally in the camera, and spring means biasing said member whereby one stop is engaged by the element before the other, means operable from outside the camera for retracting the second element from registering position to its side position, a slideway for a transparent sheet having the same refraction as said second element and movable into registering position parallel to the first element.

8. In a color separation camera, the combination of means for supporting a sensitized element or a ground glass in the focal plane of the camera, a slideway for a second sensitized element to overlie the first element in register therewith or to be positioned completely to one side thereof where it may be placed in or removed from the slideway, said slideway having edges to overlie opposite margins of the second element and having a fixed position axially of the camera, spring means to press against opposite edges of the second sensitized element and urge the element against the fixed edges and cooperating with said slideway for holding the second element parallel to the first element, means operable from outside the camera for retracting the second element from registering position to its side position, a slideway for a transparent sheet having the same refraction as said second element and movable into registering position parallel to the first element.

9. In a color separation camera, the combination of means for supporting a sensitized element or a ground glass in the focal plane of the camera, a slideway for a second sensitized element to overlie the first element in register therewith or to be positioned completely to one side thereof where it may be placed in or removed from the slideway, said slideway having edges to overlie opposite margins of the second element and having a fixed position axially of the camera, spring means to press against opposite edges of the second sensitized element and urge the element against the fixed edges and cooperating with said slideway for holding the second element parallel to the first element, a sheet in front of the side position of said second element and having a finger guide therein for guiding a finger pushing said second element into registering position, and lateral registering means comprising a pivoted member having spaced stops, one at either side of the pivot, to engage a vertical edge of said second element in the slideway and locate the element laterally in the camera, and spring means biasing said member whereby one stop is engaged by the element before the other, means operable from outside the camera for retracting the second element from registering position to its side position, a slideway for a transparent sheet having the same refraction as said second element and movable into registering position parallel to the first element, means for moving said transparent sheet into registering position as said second element is retracted by operation of the retracting means.

10. In a color separation camera, the combination of means for supporting a sensitized element or a ground glass, means for supporting a second sensitized element or processed negative in a plane parallel to said first sensitized element, means for supporting a transparent sheet having the same refraction as said negative in a third plane parallel to said first sensitized element, means permitting movement of said second element and said sheet into and out of register with said first sensitized element, and means for accurately reregistering said processed negative with said first sensitized element after said processed negative has been returned to the camera after exposure and processing including spring means pressing the opposite edges of said negative axially of the camera against fixed members and a lateral register stop having means for stopping lateral movement of the negative.

11. In a color separation camera, the combination with a plate holder, a guideway for a plate to be parallel with a plate in the plate holder and to register therewith, lateral register means for the second plate comprising a pivoted member having spaced stops, one at either side of the pivot and engageable with an edge of the slidable plate normal to its path of movement, spring means for biasing the pivoted member so the stops engage successively, said guideway having upper and lower guides, the upper guide being interrupted to allow insertion and removal of the plate, a sheet extending between the guides and having a finger guiding channel therein parallel to the guides.

12. In a color separation camera, the combination of upper and lower parallel, grooved slideways for holding a masking plate parallel to the focal plane and upper and lower channels for holding a sensitized plate to be exposed therein, means in each slideway for resiliently urging a plate axially of the camera, towards a fixed portion of each slideway, said slideways being sufficiently long to permit a masking plate to be slid into and completely out of the exposure area of the camera, and a plate having a central horizontally extending groove therein in front of said slideways extending over the non-exposure area and forming a finger guide whereby the masking plate may be manually moved to exposure position.

FRANK T. POWERS.
AUGUSTIN J. POWERS, JR.
FRANCIS E. WATTIER.

REFERENCES CITED

The following references are of record in the file of this patent:

UNITED STATES PATENTS

| Number | Name | Date |
|---|---|---|
| 280,166 | Flammang | June 26, 1883 |
| 552,766 | Levy | Jan. 7, 1896 |
| 1,052,029 | Bander | Feb. 4, 1913 |
| 1,478,278 | Harlow | Dec. 18, 1923 |
| 1,653,408 | Olsen | Dec. 20, 1927 |
| 1,847,010 | Koppe | Feb. 23, 1932 |
| 2,115,233 | Powers | Apr. 26, 1938 |
| 2,150,974 | Huebner | Mar. 21, 1939 |
| 2,241,263 | Koppe | May 6, 1941 |
| 2,402,107 | Wekeman | June 11, 1946 |

OTHER REFERENCES

Ilford Manual of Process Work, 1924, by L. P. Clerc, page 119.